Feb. 25, 1969  C. J. GREEN  3,429,200

AUTOMATIC SPEED CHANGE TRANSMISSION

Filed Aug. 23, 1966  Sheet 1 of 2

INVENTOR
CARL J. GREEN
BY

Feb. 25, 1969      C. J. GREEN      3,429,200

AUTOMATIC SPEED CHANGE TRANSMISSION

Filed Aug. 23, 1966

INVENTOR
CARL J. GREEN

United States Patent Office 3,429,200
Patented Feb. 25, 1969

3,429,200
AUTOMATIC SPEED CHANGE TRANSMISSION
Carl J. Green, 1704 McClain Road,
Knoxville, Tenn. 37912
Filed Aug. 23, 1966, Ser. No. 574,419
U.S. Cl. 74—674        1 Claim
Int. Cl. F16h 3/74, 37/06, 47/04

ABSTRACT OF THE DISCLOSURE

An automatic speed change transmission infinitely variable from a rest position of the driven member to a 1:1 ratio between input and output torques. A single input torque is divided into two inputs which are transmitted through separate, but interdependent, power trains to a single output shaft. Feedback torque values determine the relative contribution of each power train to the output torque.

---

This invention relates to automatic speed change transmissions, particularly those employing planetary gear arrangements.

The complexity of automatic transmissions in general is well recognized in the art. Complex design increases the ultimate cost of the transmission because the more complex transmission requires relatively more material of construction, more expense for fabricating intricate mechanisms, and more assembly time. Moreover, the complexity of design results in numerous moving parts of the transmission hence great likelihood of malfunction and relatively more wear of the parts.

One of the objects of the present inventor's automatic speed change transmission is to provide a relatively simply constructed automatic speed change transmission. The basic unit component of his automatic transmission is a planetary gear arrangement.

Another object is to provide a planetary gear arrangement capable of transmitting dual input torques as a single output torque.

It is also an object to provide a fully automatic speed change transmission, said transmission being designed to minimize wear.

It is also an object to provide an automatic speed change transmission infinitely variable from a rest position of the driven member to a 1:1 ratio between input and output torques.

It is also an object to provide a planetary gear system amenable to a variety of power input means.

It is a further object to provide an automatic speed change transmission employing hydraulic converter means in combination with a planetary gear arrangement.

It is a further object to provide an automatic speed change transmission having both forward and reverse modes of operation.

The present invention comprehends transmission of dual input torques to a single output shaft by separate power trains, each power train transmitting a different torque to the output shaft by virtue of its gear ratio, the power trains being mutually cooperative for transmission of variable distinct input torques to said single output shaft. The present speed change transmission is of simple design hence particularly desirable in low power applications such as small automobiles, motorcycles and bicycles.

Figure 1:
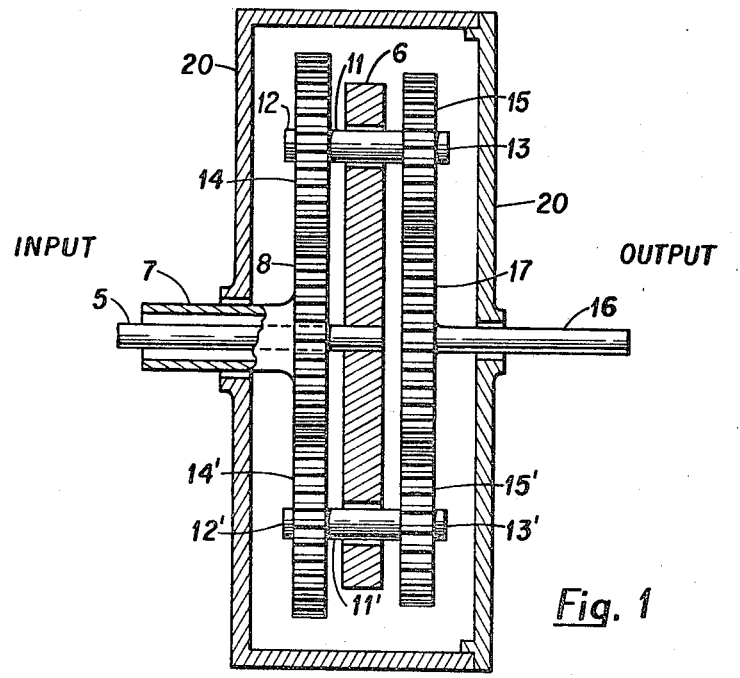
Figure 2:
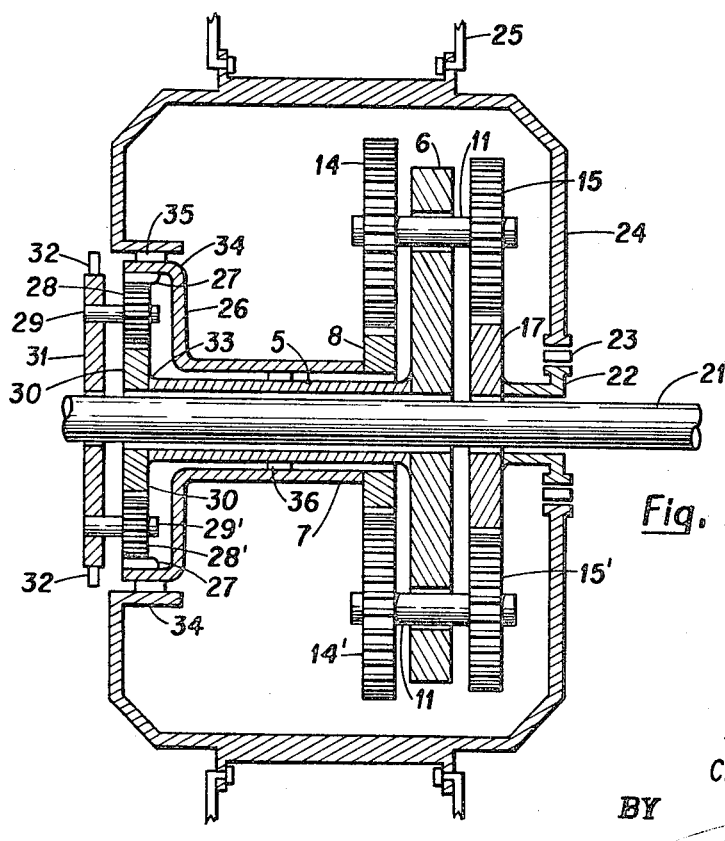
Figure 3:
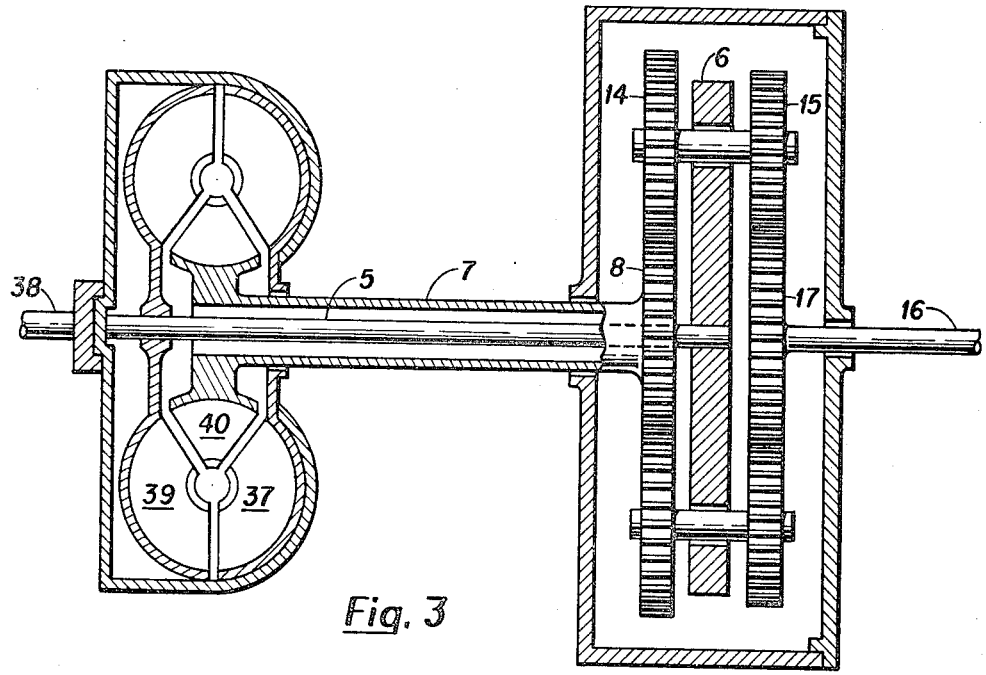
Figure 4:
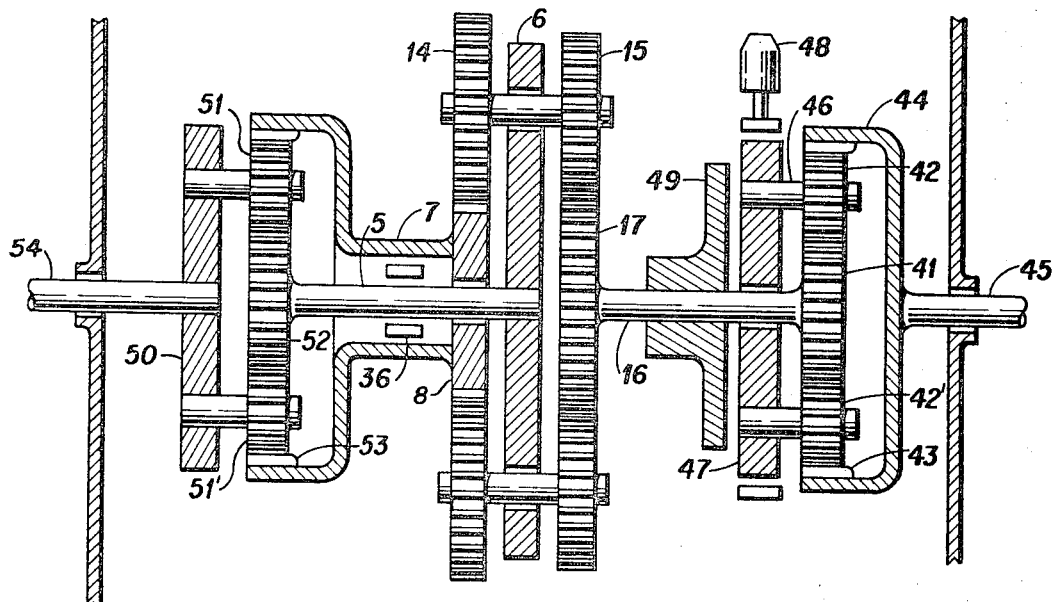

FIGURE 1 is a schematic representation of the basic planetary gear arrangement employed in the inventor's speed change transmission, FIGURE 2 is a schematic representation of the present inventor's speed change transmission employing mechanical power input means in combination with the planetary gear arrangement of FIG. 1, FIGURE 3 is a schematic representation of the present inventor's speed change transmission employing hydraulic torque convertor power input means with the planetary gear arrangement of FIG. 1, and FIGURE 4 is a schematic representation of the present inventor's speed change transmission in combination with a reversing mechanism operatively disposed on the output shaft thereof.

FIGURE 1 depicts the inventor's speed change transmission in its most basic form. A first input shaft 5 rotatably disposed within a housing 20, has rigidly affixed to one end thereof and within housing 20, a carrier disc 6. A second input shaft 7 rotatably supported in housing 20, coaxially of said first input shaft 5, carries a first sun gear 8 keyed to one of its ends. It is noted that sun gear 8 resides on the input side of carrier 6 and is parallel thereto. A multiplicity of stub shafts 11 and 11' are rotatably disposed in the circumferential region of carrier disc 6, each of said shafts having a portion 12 and 12' thereof extending perpendicularly from said carrier 6 on the input side thereof and a portion 13 and 13' likewise extending from said carrier 6 but on the output side thereof. Individual planetary gear members 14 and 14' comprising a first set of planetary gears are keyed to the input side portions 12 and 12' of shafts 11 and 11' respectively. Planetary gear members 15 and 15', comprising a second set, are keyed to the output side portions 13 and 13' of shafts 11 and 11' respectively. An output shaft 16 is rotatably disposed in housing 20 on the output side of carrier 6. The axis of output shaft 16 is common with the projected axis of shafts 5 and 7. A second sun gear 17 is secured to that end 18 of output shaft 16 adjacent to the output side of carrier 6. First sun gear 8 operatively meshes with planetary gear members 14 and 14' and second sun gear 17 operatively meshes with planetary gear members 15 and 15'. Sun gears 8 and 17 approach, but do not equal each other in diameter; sun gear 8 is smaller than gear 17. Since planetary gears 14, 14', 15 and 15' reside on common shafts and are required to mesh with sun gears and 17 which are of different diameters, planetary gears 14 and are larger than planetary gears 15 and 15'. Sun gear 8 and planetary gears 14 and 14' may be identical in size. Said gears are of identical size in the embodiment depicted in FIG. 1. It is to be understood that the critical size relationship is that of sun gear 8 and sun gear 17. Therefore one could, if desired, choose planets 14 and 14' of a size larger or smaller than sun gear 8. Of course, a corresponding choice of size for planets 15 and 15' would then be necessary so that with the planets 14 and 15, and 14' and 15' residing on stub shafts 11 and 11' respectively, the planets would mesh with their respective sun gears.

As a functioning unit the planetary gear arrangement of FIG. 1 is designed to accept two companion input torques and selectively transmit that torque which will rotate a single output shaft under load. That is, the torque which is transmitted will be determined by the load upon the output shaft.

As taught herein, by addition of specific transmission components to the basic planetary gear arrangement, one is able to readily construct a simple automatic speed change transmission amenable to a variety of applications. For example, input torques from mechanical or hydraulic power drive means are acceptable. Moreover, reversing mechanisms can be added as desired.

Even though a minimum of mechanical apparatus is employed in the present automatic transmission, its operability remains superior as is an object of the present invention. Initially dual input torques are so cntrolled within the transmission that a loaded output shaft rotates as a function of the rotational speed of a first input shaft.

Lessening of the load on the output shaft is experienced, by design, on the input side of the transmission. Torque loads greater than a preselected value on the output shaft effect a shift within the transmission, the shift being substantially imperceptible except visually, such as when additional components of the transmision commence to move.

By way of illustrating the use of the aforedescribed planetary gear arangement as depicted in FIG. 1, FIG. 2 depicts a speed change transmission wherein dual input torques are created by mechanical means. The embodiment of FIG. 2 is representative of an automatic speed change transmission wherein dual input torques are created by mechanical means. The embodiment of FIG. 2 is representative of an automatic speed change transmission for use on bicycles, motorcycles, small automobiles, or the like. The planetary gear arrangement of FIG. 1 will be immediately recognized as being a component part of the transmission depicted in FIG. 2, like numbers representing like components in the figures. The first input shaft 5 depicted in FIG. 1 as being a solid shaft, has been altered in FIG. 2 to a hollow tubular shaft. The output shaft of FIG. 1, which was also solid, has been altered to a hollow tubular shaft 16 in FIG. 2. Moreover, in the embodiment of FIG. 2, output shaft 16 is provided with a circumferential projection 22 to which housing 24 is rotatably coupled by means of a unidirectional clutch 23 restricting rotation of housing 24 to clockwise motion while allowing "free wheeling" of housing 24 as desired. The entire transmission depicted in FIG. 2 is rotatably mounted on a central shaft 21. Shaft 21 is the means whereby the transmission is mounted in the existing frame of a conventional bicycle.

The mechanical means for generating dual input torques to the planetary gear arrangement comprises the usual bicycle sprocket 31 having a multiplicity of circumferential teeth 32 and driven by the usual chain means found on a bicycle. Sprocket 31 is rotatable on shaft 21 and has mounted in its circumferential region a multiplicity of shafts 29 and 29' carrying a set of star planetary gears 28 and 28', which mesh with a sun gear 30 fixedly secured to the outboard end 33 of hollow shaft 5 and also mesh with a ring gear 27 secured to an annular shoulder portion 34 provided on the outboard end of shaft 7.

Unidirectional clutch means 35 are provided between shoulder 34 on shaft 7 and housing 24. This clutch means restricts rotation of shaft 7, hence ring gear 27 affixed thereto, to the same direction as shaft 5 (clockwise). Further clutch means 36 disposed between coaxial shafts 5 and 7 precludes shaft 7 from at any time rotating at a speed greater than that of shaft 5. The functioning of the clutch units will become apparent from the further description which follows.

A multiplicity of conventional bicycle wheel spokes 25 are secured to housing 24 circumferentially thereof. Thus when output shaft 16 is rotated, the torque created thereby is transmitted through housing 24, and spokes 25 to drive the bicycle wheel.

It is understood that all rotating components of the depicted transmission are provided with appropriate bearings which are readily supplied by one skilled in the art.

In operation, assuming a load on output shaft 16, the speed change transmission depicted in FIG. 2 functions as follows: sprocket 31 is driven by the usual pedaling of the bicycle or by motor means, either of which is connected in driving relation to sprocket 31 by the usual chain drive (not shown) found on a bicycle. As sprocket 31 is rotated in a clockwise direction, it carries with it shafts 29 and 29'. Thus star planetary gears 28 and 28' are revolved clockwise around sun gear 30.

Assuming a load on sun gear 30 and since star planets 28 and 28' also mesh with ring gear 27, their revolution in a clockwise direction produces a reaction force in a counterblockwise direction against ring gear 27. Because ring gear 27 is restrained against counterclockwise rotation by means of unidirectional clutch 35, revolution of star planets 28 and 28' overcomes the load on sun gear 30 and rotates the same. The rotational direction of sun gear 30 is also clockwise. Sun gear 30, being fixedly secured to shaft 5, hence carrier disc 6 (fixedly secured to shaft 5), rotates said shaft and disc clockwise. As carrier disc 6 is rotated clockwise, stub shafts 11 and 11' and planets 14, 14', 15 and 15' are revolved in a clockwise direction. Planets 14 and 14' mesh with and revolve around sun gear 8 which is stationary, at the instant in time presently under consideration, as a consequence of its direct connection with shaft 7 and ring gear 27 which, as previously described, has applied thereto counterclockwise force which it is restrained against. Sun gear 8, being stationary, will cause clockwise rotation of planets 14 and 14' as they revolve about said sun gear. Planets 15 and 15' thus become slave gears to planets 14 and 14', planets 15 and 15' rotating at the same rate and in the same direction (clockwise) as planets 14 and 14'. However, because planets 15 and 15' are smaller in diameter and reside on the same rotational shafts as planets 14 and 14', said planets 15 and 15' travel a shorter peripheral distance per rotation than do planets 14 and 14'. Recalling that planets 15 and 15' mesh with sun gear 17 and revolve thereabout in a clockwise direction, because of the increased length of the peripheral paths of planets 15 and 15' as compared to that of planets 14 and 14' and further because of the relative diametral dimensions of planets 14 and 14' and planets 15 and 15' and sun gear 8 and sun gear 17, a reaction rotational force, clockwise in direction, is imposed upon sun gear 17, hence shaft 16 fixedly secured thereto. The rotational speed of sun gear 17 is thus establshed by the relationship of the relative sizes of the aforementioned planets and sun gears. Specifically, assuming that planets 14 and 14' and sun gear 8 possess twenty-one teeth each and are of identical diametral dimension and planets 15 and 15' possess twenty teeth each and are identical in diameter and sun gear 17 possess twenty-two teeth, then further assuming sun gear 8 to be stationary, each rotation of carrier disc 6, hence revolution of planets 14, 14', 15 and 15' will produce $\frac{1}{11}$ rotation of sun gear 17, hence output shaft 16. (This fraction is reduced to 1/5.1 by star planets 28 and 28' and sun gear 30.) As the size of sun gear 17 approaches that of sun gear 8 but remains larger, assuming planets 15 and 15' being altered compensatingly in size, and further assuming planets 14 and 14' and sun gear 8 remain identical in size, each rotation of carrier disc 6 will produce less rotation of sun gear 17. Therefore, maximum mechanical advantage of the subject transmission is obtained when sun gear 17 is only slightly larger than sun gear 8. It now can be understood that, assuming sun gear 8 to be stationary, changes in the rotational speed of carrier 6 create corresponding changes in the rotational speed of shaft 16.

The load on output shaft 16 is at all times transmitted "backwards" through the transmission through two power trains. A first power train from shaft 16 comprises, typically, sun gear 17, planet 15, stub shaft 11, planet 14, sun gear 8, shaft 7 and ring gear 27 to the star planets 28 and 28'. A second power train comprises, typically, sun gear 17, planet 15, stub shaft 11, carrier disc 6, shaft 5, and sun gear 30 to the star planets 28 and 28'. Therefore, assuming all input torques to be developed from star planets 28 and 28', whether ring gear 27 or sun gear 30 will be moved by the star planets is determined by the load on output shaft 16 as transmitted to ring gear 27 and sun gear 30 through the respective power trains and the relative gear ratios across the separate power trains.

A relatively larger load on shaft 16 is transmitted simultaneously via the two power trains to ring gear 27 and sun gear 30. The gear ratio across the first power train to ring gear 27 causes a counterclockwise force to be experienced by ring gear 27 when star planets 28 and 28' are revolved in their orbit. Since ring gear 27 is restrained against counterclockwise rotation by clutch means 35, no movement of ring gear 27 occurs. But sun gear 30 experiences a clockwise rotational force and it is so driven by the revolving star planets.

When the inertia of the driven vehicle, bicycle in the present example, is overcome and the load on shaft 16 is decreased to a point where, because of the gear ratio across the first power train, the counterclockwise force experienced by ring gear 27 becomes a clockwise force, said gear 27 commences to rotate, thereby rotating shaft 7 and sun gear 8 clockwise.

As sun gear 8 is rotated, the effect upon planets 14 and 14' 15 and 15' is to reduce their rotational speed. When the rotational speed of shaft 7, hence sun gear 8 equals that of carrier disc 6, planets 14, 14', 15 and 15' cease to rotate on stub shafts 11 and 11' but continue to revolve with carrier disc 6 and output shaft 16. At this point in time all components of the transmission will be traveling at the same rotational speed relative to each other, that is, there is a 1:1 ratio between the input torque and the output torque. Since a large majority of the operation time of the transmission will be in high gear when all the transmission components are moving as a unit, the present transmission experiences a minimum of wear. A unidirectional clutch 36 disposed between coaxial shafts 5 and 7 precludes the rotational speed of shaft 7 from exceeding that of shaft 5.

It is particularly noted that the transition from no movement of ring gear 27 to clockwise rotation of said gear at the same rotational speed as that of sun gear 30 occurs in an infinitely variable manner, that is, there are no externally distinguishable increments of increase or decrease in the relative rotational speeds of ring gear 27 and sun gear 30. Moreover, the rotational speed experienced by output shaft 16 varies from zero rotational speed to a 1:1 ratio between the input torque to the output torque. Still further, this change in the ratio of input torque to output torque is automatically altered, increased or decreased, as the load upon shaft 16 alters under dynamic operating condition, in an infinite manner.

Changes, either increases or decreases, in the load on shaft 16 are transmitted to ring gear 27 and sun gear 30, these two components being representative of dual inputs to the planetary gear arrangement. As previously described hereinbefore, the transmitted load is "sensed" and compensating changes in the relative movements of ring gear 27 and sun gear 30 occur. As long as the load on output shaft 16 is within a range between an upper limit representing heavy loads and being established by the structural limitations of the system's construction material and a lower limit being established as that point where the counterclockwise force experienced by ring gear 27 becomes a clockwise force (described hereinbefore), that rotational speed of output shaft 16 is directly proportional to the rotational speed of sun gear 30, which in turn is directly proportional to the speed of pedaling in our bicycle example. Therefore, within this range, namely, "low gear," the rotational speed of output shaft 16 is directly proportional to the rotational speed of sun gear 30, reduced in accordance with the gear ratio across that power train which includes sun gear 30.

When the load on output shaft 16 decreases below the aforesaid lower limit for low gear, the rotational speed of said output shaft becomes proportional to the relative rotational speeds of ring gear 27 and sun gear 30, that is the relative magnitude of the forces of the dual input torques exerted through their respective power trains to said output shaft.

FIG. 3 depicts a speed change transmission in combination with a conventional hydraulic torque converter. The pump 37 of the torque convertor is driven by a shaft 38 from a motor (not shown). Pressure built up within the convertor is experienced by a first turbine 39 and a second turbine 40. First turbine 39 is operatively connected in driving relation to shaft 5 thus functioning as does the sun gear 30 in the embodiment of FIG. 2. Second turbine 40 is operatively connected in driving relation to shaft 7 and is the counterpart of ring gear 27 depicted in FIG. 2. It thus becomes apparent that the present speed change transmission is operable with either mechanical or hydraulic power input means.

In FIG. 4, the inventor's speed change transmission is depicted in combination with a conventional reversing mechanism comprising a sun gear 41 affixed to the outboard end of output shaft 16, star planets 42 and 42' meshing with said sum gear 41 and with a ring gear 43 operatively connected by means of an annular shoulder member 44 to a shaft 45 leading to a driven member (not shown). Star planets 42 and 42' are rotatably carried on stub shafts 46 and 46' mounted in carrier 47 rotatably positioned on shaft 16 and parallel to sun gear 41. Brake means 48 is provided to control rotation of carrier 47. A clutch means 49 is operatively mounted on shaft 16, said shaft being splined in the region wherein said clutch means is mounted. When clutch 49 is operatively engaged with the carrier 47 and the braking means 48 is simultaneously disengaged, sun gear 41, planets 42 and 42', carrier 47, clutch 49 and ring gear 43 rotate as a unit with output shaft 16 giving forward drive conditions. When clutch 49 is disengaged from carrier disc 47 and simultaneously the braking means 48 is actuated to hold the carrier 47 fixed, sun gear 41, continuing to rotate with shaft 16 (clockwise in the present example), drives star planets 42 and 42' which exert a counterclockwise rotational force to ring gear 43 thus driving shaft 45 in reverse mode of operation. It is understood that the reversing unit can be any one of the many appropriate types well known in the art.

Through the use of conventional mechanical locking means, such as a bidirectional clutch, the present transmission can be "locked" in low gear by securing input shaft 7 against rotation. By locking shafts 5 and 7 together by means of said bidirectional clutch, the transmission can be "locked" in high gear.

The power input means employed in the embodiment depicted in FIG. 4 is of the mechanical type. A shaft 54 from a motor (not shown) has attached to its end a carrier 50 which is the counterpart of sprocket 31 of FIG. 2. Said carrier carries star planets 51 and 51', which are the counterparts of star planets 28 and 28' of FIG. 2, revolving about sun gear 52 and simultaneously meshing with ring gear 53. The operation of this mechanical power input means is substantially identical with the operation of the input means hereinbefore discussed with reefrence to FIG. 2. The primary distinctions between the two is that shaft 5 is hollow in FIG. 2 and solid in FIG. 4, and the sprocket 31 of FIG. 2 is replaced with a shaft 41 and carrier 50 in FIG. 4.

I claim:

1. A speed change transmission comprising the combination of
   a first rotatable input shaft,
   a carrier disc affixed to the end of said first input shaft and rotatable therewith, said carrier disc having an input side and an output side,
   a multiplicity of stub shaft means rotatably disposed in the circumferentinal portion of said carrier and extending therefrom on both the input and output sides thereof,
   a second rotatable input shaft co-axial with said first input shaft and terminating on the input side of said carrier,
   a first rotatable sun gear secured to said second input shaft and rotatable therewith,
   a rotatable output shaft on the output side of said carrier and having an axis common with the projected axis of said input shafts but being separate therefrom,
   a second rotatable sun gear secured to said output shaft and rotatable therewith, said second sun gear being larger in diameter than said first sun gear, a first set of rotatable planetary gears secured to each of said stub shaft means on the input side of said carrier and operatively meshing with said first sun gear, a second set of rotatable planetary gears secured to each of said stub shaft means on the output side of said carrier and opeartively meshing with said second sun gear, each gear member of said second set of planetary gears being smaller in diameter than its counterpart member of said first set of planetary gears, a third sun gear secured to that end of said first input shaft opposite said carrier disc, ring gear means secured to that end of said second rotatable input shaft opposite said first sun gear, means restricting said ring gear to unidirectional rotation, a set of star planetary gears operatively engaging said third sun gear and said ring gear, and, power input means operatively connected to said set of star palnetary gears for revolving the same in the same direction as the permissive rotational direction of said ring gear.

References Cited

UNITED STATES PATENTS

| | | | |
|---|---|---|---|
| 3,306,606 | 4/1964 | Kreis | 74—751 |
| 1,445,741 | 2/1923 | Blackwell | 74—705 |
| 2,761,332 | 9/1956 | Gray et al. | 74—674 |
| 3,048,057 | 8/1962 | Dodge | 74—677 |
| 3,163,056 | 12/1964 | Clarke | 74—677 |

ARTHUR T. McKEON, *Primary Examiner.*